United States Patent
Blair et al.

(10) Patent No.: US 6,661,951 B1
(45) Date of Patent: Dec. 9, 2003

(54) OPTOELECTRIC ALIGNMENT APPARATUS

(76) Inventors: Thomas H. Blair, 117 S. Bernal Rd., San Jose, CA (US) 95119; Diana Ching Chen, 181 Via Aragon, Fremont, CA (US) 94539; Phillip J. Edwards, 6721 Positano La., San Jose, CA (US) 95138; Siegfried Fleischer, 106470 Rosewood Rd., Cupertino, CA (US) 95014; Bradley S. Levin, 212 Bryant St., Palo Alto, CA (US) 94301; Oliver W. Northrup, 1336 Gilmore St., Mountain View, CA (US) 94040; Michael M. O'Toole, 5913 Foligno Way, San Jose, CA (US) 95138; Joseph John Vandenberg, 415 N. Lark Ellen Ave., West Covina, CA (US) 91791; Brett Matthew Zaborsky, 79 N. 10th St., Unit A, San Jose, CA (US) 95112

( * ) Notice: Subject to any disclaimer, the term of this patent is extended or adjusted under 35 U.S.C. 154(b) by 27 days.

(21) Appl. No.: 09/954,919

(22) Filed: Sep. 12, 2001

Related U.S. Application Data
(60) Provisional application No. 60/275,000, filed on Mar. 12, 2001.

(51) Int. Cl.[7] ................................. G02B 6/32
(52) U.S. Cl. .............................. 385/33; 385/74; 385/93
(58) Field of Search ................... 385/33–36, 38, 385/76–79, 88, 93

(56) References Cited

U.S. PATENT DOCUMENTS

| | | | | |
|---|---|---|---|---|
| 4,057,319 A | * | 11/1977 | Ash et al. ............... | 385/54 |
| 4,183,618 A | * | 1/1980 | Rush et al. .............. | 385/79 |
| 4,421,383 A | * | 12/1983 | Carlsen .................. | 385/79 |
| 4,496,211 A | * | 1/1985 | Daniel ................... | 385/31 |
| 5,247,595 A | * | 9/1993 | Foldi .................... | 385/78 |
| 5,504,828 A | * | 4/1996 | Cina et al. .............. | 385/33 |
| 6,332,721 B1 | * | 12/2001 | Inokuchi ................. | 385/93 |

* cited by examiner

Primary Examiner—Robert H. Kim
Assistant Examiner—Michael H Caley
(74) Attorney, Agent, or Firm—Parsons & Goltry; Robert A. Parsons; Michael W. Goltry

(57) ABSTRACT

Optical alignment apparatus includes a first element mounting a first lens and a light source and a second element mounting a second lens and a light receiving structure. The first lens is placed a first distance from the light source and is constructed to collimate light received from the light source. The first and second elements are mounted relative to each other to position the second lens a third distance from the first lens and to receive the collimated light from the first lens. The second lens is positioned a second distance from the light receiving structure to focus the collimated light on the light receiving structure. The first and second lens are constructed so that the first and second distances are dependent upon each other and the third distance is independent of the first and second distances.

30 Claims, 4 Drawing Sheets

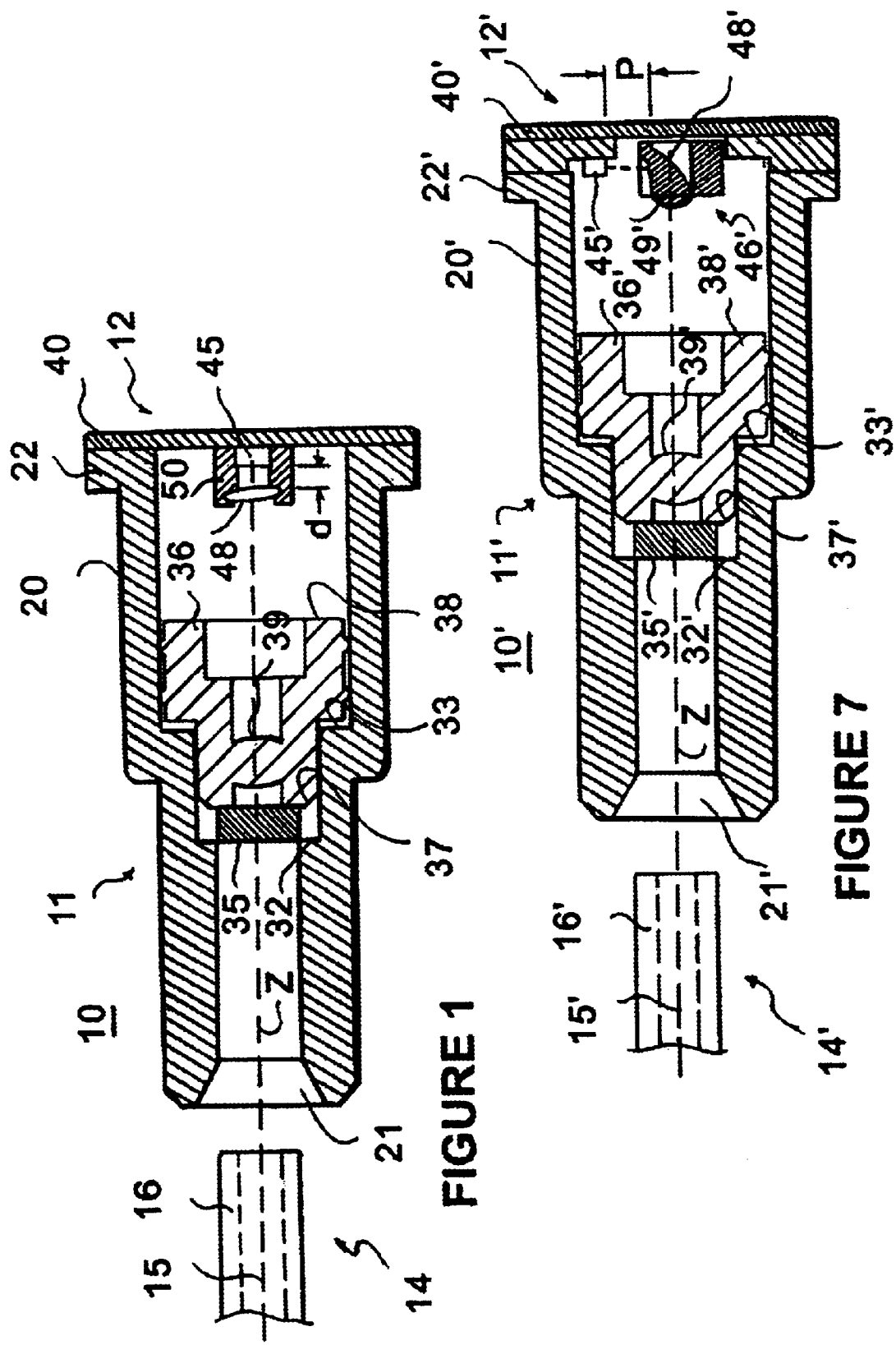

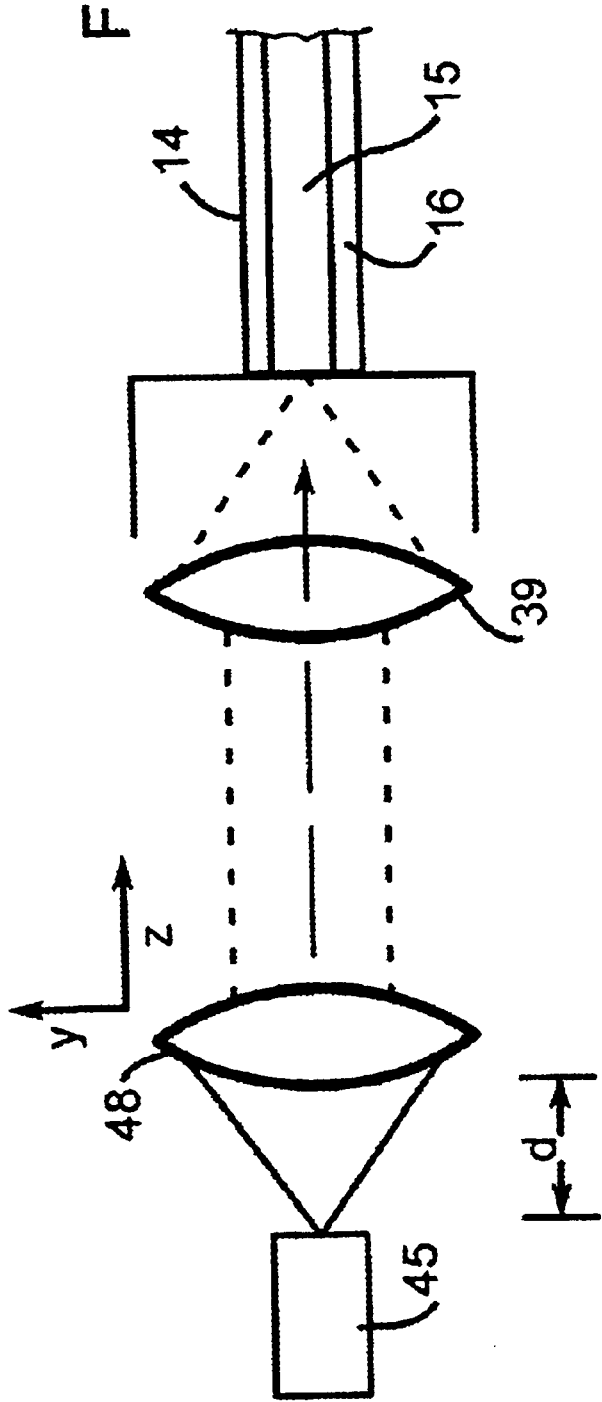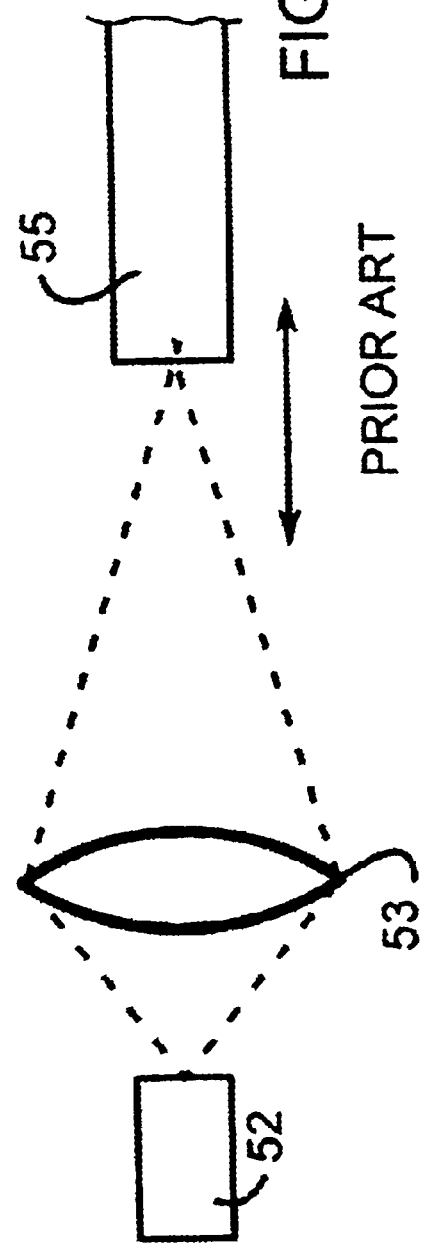

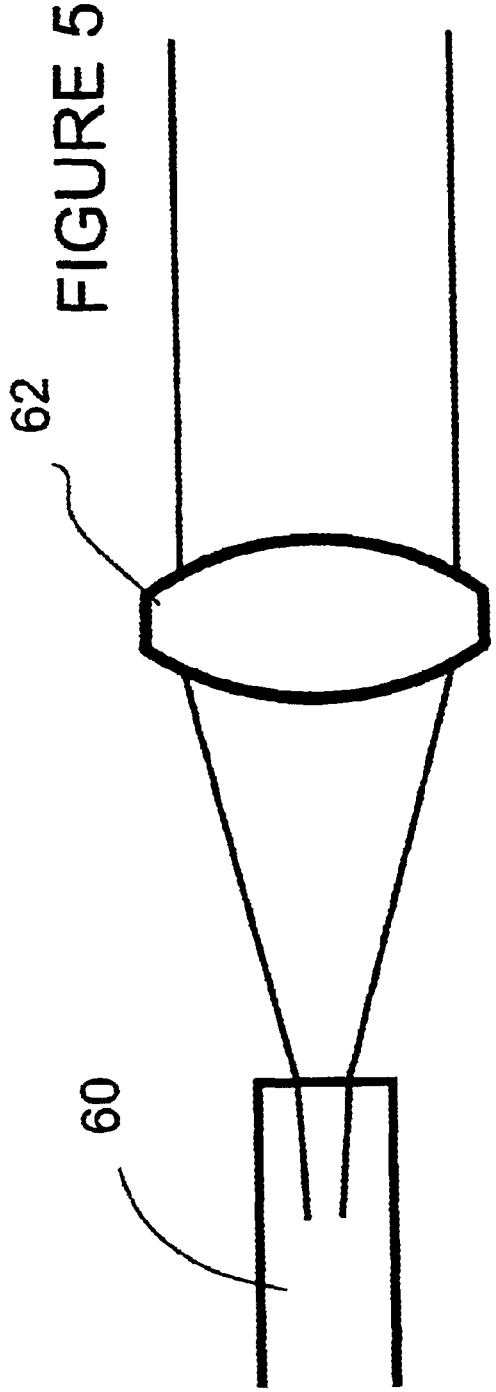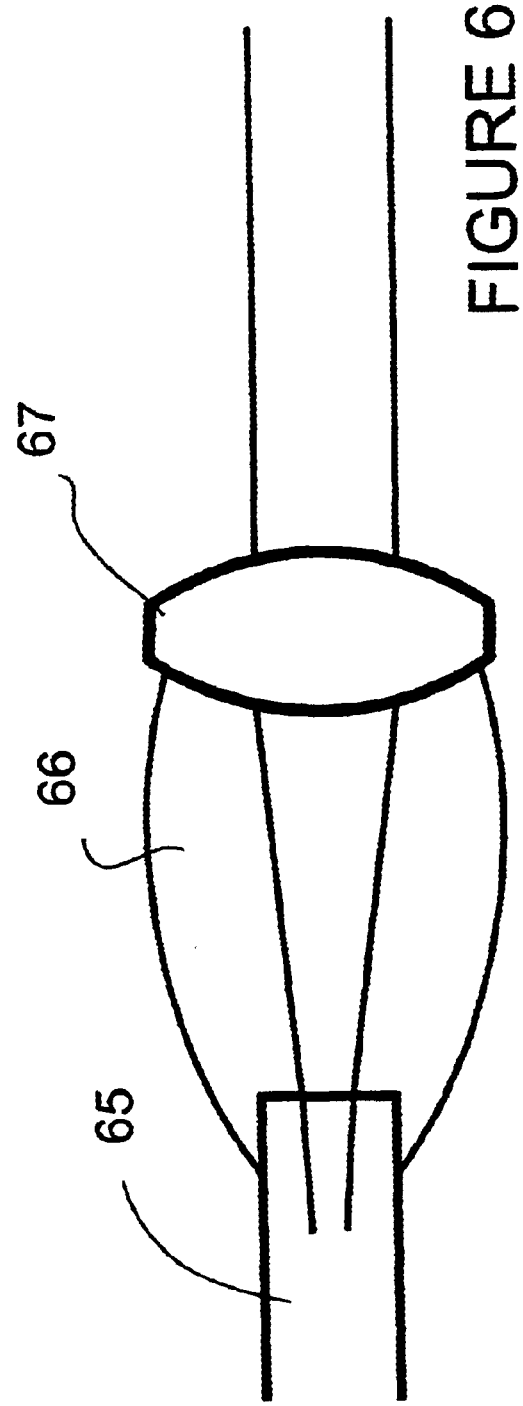

OPTOELECTRIC ALIGNMENT APPARATUS

CROSS-REFERENCE TO RELATED APPLICATION

This application claims the benefit of U.S. Provisional Patent Application Serial No. 60/275,000 filed Mar. 12, 2001 entitled OPTICAL/ELECTRICAL MODULE.

FIELD OF THE INVENTION

This invention relates to optical-to-electrical and electrical-to-optical modules.

More particularly, the present invention relates to optical alignment features in such modules.

BACKGROUND OF THE INVENTION

In optical-to-electrical and electrical-to-optical (hereinafter "optoelectric") modules used in the various communications fields, one of the most difficult problems that must be solved is the efficient transmission of light between a light. generating device and an optical fiber or, alternatively, the transmission of light from the optical fiber to a light receiving device. Here it will be understood by those skilled in the art that the term "light" is a generic term which includes any electromagnetic radiation that can be modulated and transmitted by optical fibers or other optical transmission lines. Because optical fibers and the active regions of light generating devices and light receiving devices are very small, alignment of an optical fiber with a light generating device or a light receiving device is difficult and can be very work intensive and time consuming.

For example, one method used to align an optical fiber with a light generating device or a light receiving device is called active alignment. In this process a light is introduced at one end of the optical fiber and the other end is moved adjacent the active area of an operative light receiving device, while monitoring the output of the light receiving device, until a maximum output signal is received. Alternatively, an operative light receiving device is attached to one end of an optical fiber and the other end is moved adjacent the active area of an operative light generating device until a maximum output signal is received. In both instances the amount of time and effort required to obtain the optimum alignment is extensive.

In a perfect system, all of the light generated passes directly into an optical fiber and all of the light exiting an optical fiber is directed onto an active surface of a light receiving device. However, in the real world much of the generated light travels outwardly in a direction to miss the optical fiber and some of the light impinging on the optical fiber is reflected back into the light generating device. Much of the cause of this outwardly or misdirected light comes from poor alignment along the Z axis (the axis of light propagation) as well as misalignment in the X and Y axes (defining a plane perpendicular to the direction of light propagation). The outwardly or misdirected light can impinge on adjacent devices to produce unwanted cross-talk within the system. Also, the reflected light can be directed back into the light generating device or the optical fiber and can interfere with generated light to produce unwanted and troublesome modes or frequencies. Also, the loss of light through misdirection and/or reflection means that additional power must be used to produce sufficient light to transmit between various devices, thus reducing efficiency.

It would be highly advantageous, therefore, to remedy the foregoing and other deficiencies inherent in the prior art.

Accordingly, it is an object the present invention to provide new and improved optical alignment features.

Another object of the present invention is to provide new and improved optical alignment features which reduce time and effort in alignment procedures.

And another object of the present invention is to provide new and improved optical alignment features which improve the efficiency of optical systems.

Still another object of the present invention is to provide new and improved optical alignment features which allow the use of a variety of components and component materials.

SUMMARY OF THE INVENTION

Briefly, to achieve the desired objects of the present invention in accordance with a preferred embodiment thereof, provided is optical alignment apparatus which includes a first element mounting a first lens and a light source and a second element mounting a second lens and a light receiving structure. The first lens is placed a first distance from the light source and is constructed to collimate light received from the light source. The first and second elements are mounted relative to each other to position the second lens a third distance from the first lens and to receive the collimated light from the first lens. The second lens is positioned a second distance from the light receiving structure to focus the collimated light on the light receiving structure. The first and second lens are constructed so that the first and second distances are dependent upon each other and the third distance is independent of the first and second distances.

In general, the light source is one of a laser, a light emitting diode, a light communicating optical fiber, or any other source of light for communication and the light receiving structure is any device that converts light energy into electrical energy, such as a photo-diode, a PIN diode, or one end of a light communicating optical fiber having such a: device positioned at the other end. The lens are constructed and positioned so that the first distance between the light source and the first lens determines a major portion of the optical power of the apparatus, so that the second lens can be formed of a low tolerance molded plastic part. Also, in some embodiments one of the first and second lenses can be formed to direct, impinging light received along a first axis, at an angle to the first axis and may include, for example, a curved reflecting surface.

BRIEF DESCRIPTION OF THE DRAWINGS

The foregoing and further and more specific objects and advantages of the invention will become readily apparent to those skilled in the art from the following detailed description of a preferred embodiment thereof, taken in conjunction with the drawings in which:

FIG. 1 is a sectional view of a simplified optoelectric module in accordance with the present invention;

FIG. 2 is a simplified schematic view of a lens system in a standard module;

FIG. 3 is a simplified schematic view of a lens system in the optoelectric module of FIG. 1;

FIG. 5 is a simplified schematic view representing a medium change, including air, in the passage of light;

FIG. 6 is a simplified schematic view representing a medium change in accordance with the present invention; and FIG. 7 is a sectional view of another embodiment of a simplified optoelectric module in accordance with the present invention.

DETAILED DESCRIPTION OF PREFERRED EMBODIMENTS

Figure 4:
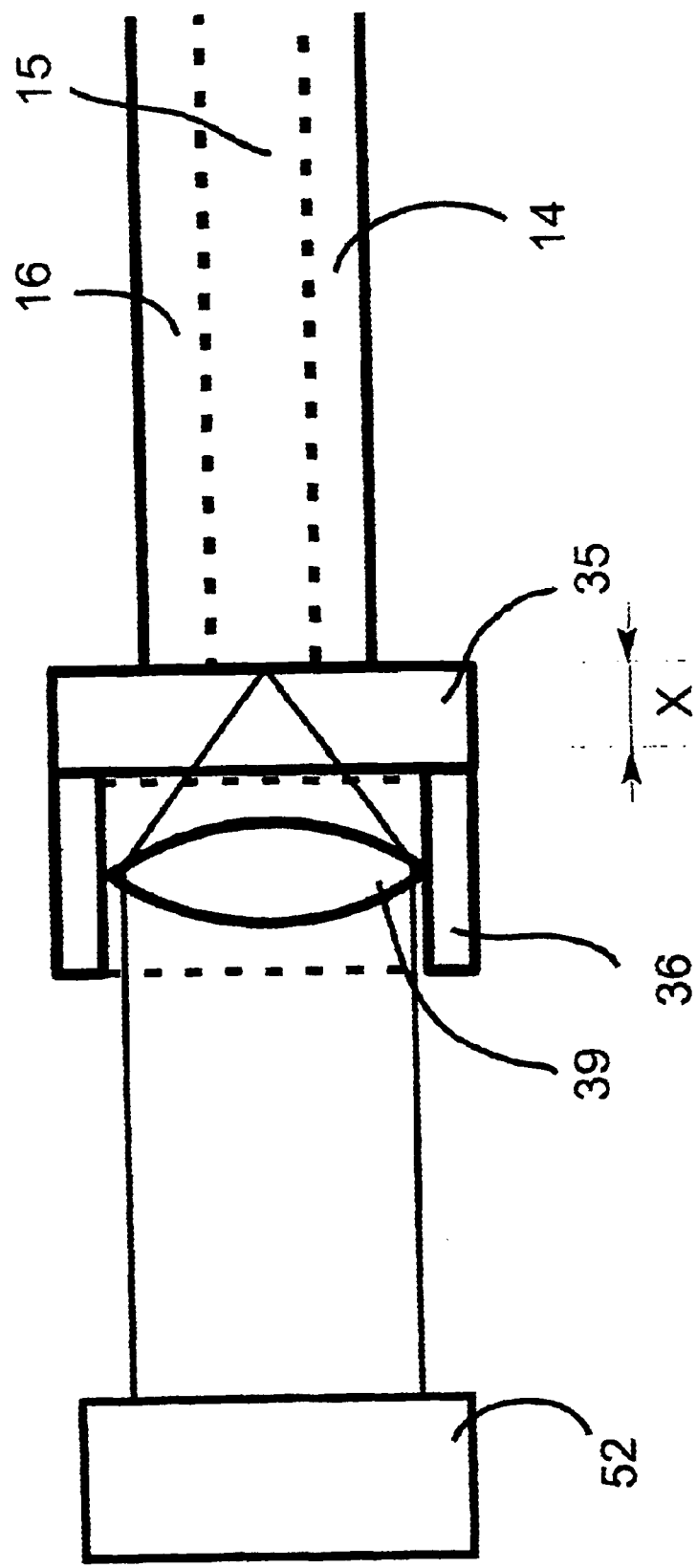
FIG. 4 is a simplified schematic view of Z-axis adjustment apparatus.

The present invention provides new and improved alignment features for telecommunication and data communication apparatus and the like and in particular for optoelectric modules. Turning to FIG. 1, a sectional view is illustrated of a simplified optoelectric module 10 in accordance with the present invention. As stated above, the term "optoelectric" is used herein to denote the fact that module 10 can be either an optical-to-electrical or electrical-to-optical module.

It will be understood by those skilled in the art that modules of the type discussed herein generally include a pair of channels, one of which receives electrical signals, converts the electrical signals to optical (light) beams by way of a laser or the like and introduces them into one end of an optical fiber, which then transmits the modulated optical beams to external apparatus. The second channel of the module receives modulated optical beams from an optical fiber connected to the external apparatus, conveys the modulated optical beams to a photo diode or the like, which converts them to electrical signals. In the following description, the apparatus and methods can generally be used in either of the channels but, since the optical portions of the two channels are substantially similar, only one channel will be discussed with the understanding that the description applies equally to both channels. Also, throughout this disclosure the term "laser" is intended to denote any light source including, for example, a laser, a light emitting diode, the end of a light communicating optical fiber, etc. and light receiving structures are intended to include any one of a photodiode, a pin diode, an end of a light communicating optical fiber, etc.

Module 10 of FIG. 1 includes a receptacle element or assembly 11 and an optoelectric element or package 12 aligned and affixed together, as will be disclosed in more detail below. Receptacle assembly 11 is designed to receive an optical fiber 14 in communication therewith, in a manner that will become clear presently. In the preferred embodiment, optical fiber 14 is a single mode fiber (the use of which is one of the major advantages of the present invention) including a glass core 15 and a cladding layer 16. Receptacle assembly 11 includes an elongated cylindrical ferrule 20 defining a fiber receiving opening 21 at one end and a mounting flange 22 at the opposite end.

Progressing from the end of module 10 which defines opening 21 toward the end defining flange 22, ferrule 20 has two radially outwardly directed steps 32 and 33. Step 32 provides a surface or stop for the mounting of an optical spacer 35 and step 33 provides a surface or a stop for the positioning of an optical lens assembly 36. In this preferred embodiment, lens assembly 36 is formed of plastic and may be, for example, molded to simplify manufacturing of module 10. It should be understood that the term "plastic" is used herein as a generic term to describe any non-glass optical material that operates to transmit optical beams of interest therethrough and which can be conveniently formed into lenses and the like. Similarly, the term "glass" is defined as any material that is substantially temperature insensitive (i.e., stable throughout the operating temperature of the module), such as glass, crystalline material, or semiconductor material (e.g. silicon, oxides, nitrides, some ceramics, etc.). For example, in most optical modules used at the present time the optical beams are generated by a laser that operates in the infra-red band and any materials that transmit this light, including some oxides and nitrides, come within this definition.

Lens assembly 36 defines a central opening for the transmission of light therethrough which extends from an end 37 to an opposite end 38. A lens 39 is integrally formed in the central opening a fixed distance from end 37. Lens assembly 36 is frictionally held in place within ferrule 20 and holds spacer 35 fixedly in place. Also, lens 39 is spaced a fixed and known distance from spacer 35. In this preferred embodiment, optical fiber 14 is inserted into ferrule 20 so that glass core 15 buts against spacer 35, which substantially reduces or suppresses return reflections.

Optoelectric package 12, in this simplified embodiment, includes a base or support plate 40 with an optoelectric device, such as a laser 45, mounted on the upper surface and positioned to transmit light generated therein substantially perpendicular to the surface of support plate 40. Alternatively, laser 45 could be a photodiode or the like. A lens 48 is mounted in a housing 50 and spaced a fixed distance, designated d, from laser 45. It will be understood that housing 50 can be designed to be mounted over or adjacent the optoelectric device or could be manufactured as an integral component of the optoelectronic device. Here it will be understood that housing 50 fixes lens 48 relative to laser 45 so as to accurately position it relative to laser 45 or accurately determine the distance d.

Optoelectric package 12 is affixed to receptacle assembly 11 with flange 22 of ferrule 20 butting against the surface of support plate 40. Ferrule 20 and support plate 40 are fixedly attached together by some convenient means, such as welding, gluing, etc. Here it should be noted that laser 45 can be enclosed by this process in a hermetically sealed chamber, if desired. However, a hermetic seal is not necessary in many embodiments in which the laser or photodiode used is either separately sealed or is not sensitive to atmospheric conditions. Further, during the assembly process, optoelectric package 12 and support plate 40 are adjusted until lenses 39 and 48 are substantially optically aligned so that light from laser 45 is directed into core 15 of optical fiber 14.

Turning now to FIG. 2, a standard optical system is illustrated schematically for purposes of explaining the background. In this system, a laser 52 supplies light through a single lens 53 to an optical fiber 55. Generally, as is understood in the art, for maximum efficiency, lens 53 should focus the light from laser 52 on the end surface of the core of optical fiber 55. Because of this requirement, any changes in distance between lens 53 and optical fiber 55 changes the focus spot and, hence greatly changes the light introduced into optical fiber 55. Also, the optical coupling efficiency of the system is affected by the distance between laser 52 and lens 53. Thus positioning of the components is critical. and very little manufacturing tolerance is allowed. This is especially true when dealing with single mode optical fibers which have a core diameter less than ten microns.

Referring to FIG. 3, a simplified schematic view is illustrated of the lens system in module 10 of FIG. 1 in accordance with the present invention. In this lens system, lens 48 receives any divergent light from laser 45 and collimates the light so that it is directed to lens 39. Lens 39 focuses the impinging collimated light onto the end of core 15 of optical fiber 14. Lens 48 is fixedly positioned adjacent laser 45 and lens 39 is fixedly positioned adjacent an end of optical fiber 14. Note that lens 48 is illustrated as a common lens for purposes of simplifying this explanation but virtually any type of lens or lens system could be utilized. Here it will be understood that fixing lens 48 to laser 45 accurately positions it relative to laser 45. Also, fixing lens 39 to optical fiber 14 accurately positions it relative to optical fiber 14. Because these are short distances (on the order of microns), they can be determined relatively accurately. However, the distance between lenses 39 and 48 is less critical, which provides substantially relaxed tolerances for module 10 and for the assembling thereof. The distance between lenses 39 and 48 is not critical because the light is collimated and slight variances in position simply produce a small amount of light loss.

Because of the use of the two lens concept, the distance d on the optical axis between laser 45 and lens 48 can generally be used to determine the most desirable distance between lens 39 and the end of optical fiber 14. The distance d is a few microns and can be relatively easily maintained constant (i.e. a very small tolerance) between manufactured modules. Also, the distance d is a good indication of the most desirable distance between lens 39 and optical fiber 14, because this distance affects the optical power of the system. Thus, by measuring the distance d in any specific module a desired distance between lens 39 and optical fiber 14 can be easily calculated.

Referring additionally to FIG. 4, lens 39, spacer 35, and optical fiber 14 are illustrated in a simplified and enlarged schematic diagram. Here it can be seen that in this embodiment by adjusting the thickness x of spacer 35 the distance between lens 39 and optical fiber 14 can be easily adjusted. The thickness x can be adjusted in several different ways. In one method, optimum spacing between lens 39 and optical fiber 14 is determined in advance, generally by measuring the distance d between laser 45 and lens 48. A spacer with the correct thickness is then provided and placed in the module prior to assembly. In a second method, several thinner spacers (generally with some predefined thicknesses or steps of thicknesses) are provided and the optimum distance is achieved by selecting and affixing a plurality of thinner spacers together and placing them in the module prior to assembly of the module. Using this system, optimum light out of optical fiber 14 can be measured to determine the optimum distance x.

Turning now to FIG. 5, a simplified schematic view is illustrated representing a medium change, including air, in the passage of light from a laser 60 to the light inlet of an optical system, represented by a single lens element 62. In FIG. 5, laser 60 is spaced from lens element 62 with air or space in between. Because of the change in refractive indices between the material of laser 60 and air, light waves have a tendency to spread widely so that lens element 62 must be relatively powerful to collimate the beam.

Referring additionally to FIG. 6, a simplified schematic view is illustrated representing a medium change in accordance with the present invention. In the optical system of FIG. 6, a plastic glob 66 is introduced around the end of a laser 65 and encompasses the inlet side of a lens element 67. Thus, the change in refractive index is from laser 65 to plastic glob 66. Plastic glob 66 can be selected so that it has a refractive index closer to the refractive index of laser 65. Thus, there is less spreading of the light as it leaves laser 65 and lens element 67 can perform the required collimating with much less optical power. It can readily be seen that any improvement in refractive index produced by plastic glob 66, over air, provides a reduction in the required power of lens element 67 and simplifies the manufacture and cost of the device. Lens 67 can be mounted a fixed distance from laser 65 by plastic glob 66 alone or in conjunction with additional structure.

Turning now to FIG. 7, another embodiment is illustrated of a simplified optoelectric module 10' in accordance with the present invention. In this embodiment, components similar to the embodiment illustrated in FIG. 1 are designated with similar numbers and a prime is added to all numbers to indicate the different embodiment. Also, similar components with similar positions will not be described again in detail. In this embodiment, the optoelectric device will again be described as a laser 45' for convenience but it could be a photodiode or the like, as explained in detail above.

Laser 45' is mounted to one side of the optical axis Z, defined by, optical fiber 14' and lens 39'. A lens block 46' is constructed to define a lens 48' with a curved reflecting surface designed to direct impinging light, received at an angle to the Z axis, along the Z axis and to collimate the impinging light. Lens block 46' can be molded from plastic, including lens 48', or it can be formed to fixedly mount a glass curved reflecting surface in a fixed position relative to laser 45'. The distance d is again the distance between laser 45' and the curved reflecting surface forming lens 48'.

In a slightly different embodiment, lens block 46' can be formed with a lens 49' in the surface perpendicular to the Z axis. Lens 49' can be included in addition to the curved reflecting surface. Also, lens 49' can be included in lieu of curving the reflecting surface in some specific applications. However, if lens 49' is included in lieu of the curved reflecting surface, then the distance d includes the distance from laser 45' to the reflecting surface and the distance from the reflecting surface to lens 49'. Generally, the preferred embodiment is to include the curved reflecting surface as lens 48' and not to include lens 49', since this construction reduces the number of components.

Accordingly, new and improved optical alignment features are disclosed which substantially reduce time and effort in alignment procedures and which improve the efficiency of optical systems. Because a pair of lenses are incorporated that are fixed relative to a light source and a light receiving structure, respectively, the distance along the Z axis between the pair of lenses is not critical. Also, because the light traveling between the pair of lenses is collimated, slight variances in the lateral position (X and Y axes) of the lenses is much less critical, since such variances simply produce a small amount of light loss. Thus, manufacturing tolerances can be substantially reduced, substantially reducing manufacturing time, labor, and costs. Further, the new and improved optical alignment features allow the use of a variety of components and component materials.

Various changes and modifications to the embodiments herein chosen; for purposes of illustration will readily occur to those skilled in the art. To the extent that such modifications and variations do not depart from the spirit of the invention, they are intended to be included within the scope thereof which is assessed only by a fair interpretations of the following claims.

Having fully described the invention in such clear and concise terms as to enable those skilled in the art to understand and practice the same, the invention claimed is:

1. Optical alignment apparatus comprising:
   a first lens constructed to be placed a first distance from a light source and being further constructed to substantially collimate light received from the light source;
   a second lens constructed to be positioned a second distance from a light receiving structure and positioned a third distance from the first lens, the second lens being constructed and positioned to receive the collimated light from the first lens and to focus the collimated light on the light receiving structure, and the first and second distances being dependent upon each other with the third distance being independent of the first and second distances; and at least one of the first and second distances being defined by a thickness of at least one optical spacer.

2. Optical alignment apparatus as claimed in claim 1 wherein the first distance between the light source and the first lens determines the optical power of the apparatus.

3. Optical alignment apparatus as claimed in claim 1 wherein the light source includes one of a laser and a light emitting diode.

4. Optical alignment apparatus as claimed in claim 1 wherein the light receiving structure is a device that converts light energy into electrical energy.

5. Optical alignment apparatus as claimed in claim 1 wherein the light receiving structure is one of a photodiode and a light communicating optical fiber.

6. Optical alignment apparatus as claimed in claim 1 wherein the first lens is formed of temperature insensitive material.

7. Optical alignment apparatus as claimed in claim 6 wherein the temperature insensitive material forming the first lens includes one of glass, crystalline material, and semiconductor material.

8. Optical alignment apparatus as claimed in claim 1 wherein the second lens is formed of plastic.

9. Optical alignment apparatus as claimed in claim 8 wherein the second lens includes a low tolerance molded plastic part.

10. Optical alignment apparatus as claimed in claim 1 wherein one of the first and second lenses are formed to direct impinging light received along a first axis at an angle to the first axis.

11. Optical alignment apparatus as claimed in claim 10 wherein the one of the first and second lenses includes a curved reflecting surface.

12. Optical alignment apparatus as claimed in claim 1 wherein the at least one optical spacer includes a plurality of thinner spacers.

13. Optical alignment apparatus as claimed in claim 1 wherein the first and second distances are shorter than the third distance.

14. Optical alignment apparatus as claimed in claim 1 wherein the first and second lenses are individually mounted.

15. Optical alignment apparatus as claimed in claim 1 wherein the first lens and the light source are fixedly attached together to define the first distance.

16. Optical alignment apparatus as claimed in claim 15 wherein the first lens is fixedly attached to the light source, having an index of refraction, by means of a plastic material, having an index of refraction substantially the same as the index of refraction of the light source, so that light emitted by the light source travels through the plastic material and into the first lens and so that the plastic material defines the first distance wherein a thickness of the plastic material is greater than or equal to a thickness of the first lens.

17. Optical alignment apparatus as claimed in claim 1 wherein the second lens and the light receiving structure are fixedly attached together to define the second distance.

18. Optical alignment apparatus as claimed in claim 17 wherein the second lens is fixedly attached to a light receiving structure, having an index of refraction, by means of a plastic material, having an index of refraction substantially the same as the index of refraction of the light receiving structure, so that light travels through the second lens and the plastic material and impinges on the light receiving structure and so that the plastic material defines the second distance wherein a thickness of the plastic material is greater than or equal to a thickness of the second lens.

19. Optical alignment apparatus comprising:

a first element mounting a first lens and a light source, the first lens being placed a first distance from the light source and being further constructed to substantially collimate light received from the light source;

a second element mounting a second lens and a light receiving structure, the second lens being positioned a second distance from the light receiving structure;

wherein at least one of the first and second distances are defined by a thickness of at least one optical spacer;

the first and second elements being mounted relative to each other to position the second lens a third distance from the first lens and further positioning the second lens to receive the collimated light from the first lens, and the second element further positioning the second lens to focus the collimated light on the light receiving structure; and the first and second lens being constructed so that the first and second distances are dependent upon each other with the third distance being independent of the first and second distances.

20. Optical alignment apparatus as claimed in claim 19 wherein the first lens is formed of temperature insensitive material.

21. Optical alignment apparatus as claimed in claim 20 wherein the temperature insensitive material forming the first lens includes one of glass, crystalline material, and semiconductor material.

22. Optical alignment apparatus as claimed in claim 19 wherein the second lens is formed of plastic.

23. Optical alignment apparatus as claimed in claim 22 wherein the second lens includes a low tolerance molded plastic part.

24. Optical alignment apparatus as claimed in claim 19 wherein one of the first and second lenses are formed to direct impinging light received along a first axis at an angle to the first axis.

25. Optical alignment apparatus as claimed in claim 24 wherein the one of the first and second lenses includes a curved reflecting surface.

26. Optical alignment apparatus comprising:

a first structural portion;

a light operative device having an index of refraction, the light operative device including one of a light source and a light receiving device, mounted by the first structural portion;

a first lens mounted by the first structural portion and positioned a first distance from the light operative device;

the first lens and the light operative device being fixedly attached together by a plastic material to define the first distance, the plastic material having an index of refraction equal to the index of refraction of the light operative device wherein a thickness of the plastic material is greater than a thickness of the lens;

a second structural portion, the second structural portion being constructed to receive an optical fiber in optical communication therewith;

a second lens mounted by the second structural portion and positioned a second distance from an end of the optical fiber;

wherein the second distance is defined by a thickness of at least one optical spacer; and the second structural portion being affixed to the first structural portion so as to position the second lens a third distance from the first lens, and the first and second distances being dependent upon each other with the third distance being independent of the first and second distances.

27. Optical alignment apparatus as claimed in claim 26 wherein the light operative device includes a light source, the first lens is further constructed to substantially collimate light received from the light source, and the second lens is further positioned to receive the collimated light from the first lens and to focus the collimated light on the end of the optical fiber.

28. Optical alignment apparatus as claimed in claim 26 wherein the light operative device includes a light receiving device, the second lens is further constructed to substantially collimate light received from the optical fiber, and the first lens is further positioned to receive the collimated light from the second lens and to focus the collimated light on the light receiving device.

29. Optical alignment apparatus as claimed in claim 26 wherein one of the first and second lenses are formed to direct impinging light received along a first axis at an angle to the first axis.

30. Optical alignment apparatus as claimed in claim 29 wherein the one of the first and second lenses includes a curved reflecting surface.

* * * * *